US012755982B2

(12) United States Patent
Tabushi et al.

(10) Patent No.: US 12,755,982 B2
(45) Date of Patent: Oct. 6, 2026

(54) NON-AQUEOUS ELECTROLYTE SECONDARY BATTERY

(71) Applicant: SANYO Electric Co., Ltd., Osaka (JP)

(72) Inventors: Akihiro Tabushi, Hyogo (JP); Yuu Takanashi, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 636 days.

(21) Appl. No.: 17/909,920

(22) PCT Filed: Feb. 8, 2021

(86) PCT No.: PCT/JP2021/004632
§ 371 (c)(1),
(2) Date: Sep. 7, 2022

(87) PCT Pub. No.: WO2021/186950
PCT Pub. Date: Sep. 23, 2021

(65) Prior Publication Data
US 2024/0204198 A1 Jun. 20, 2024

(30) Foreign Application Priority Data
Mar. 16, 2020 (JP) ................................ 2020-045256

(51) Int. Cl.
*H01M 4/62* (2006.01)
*H01M 4/02* (2006.01)
(Continued)

(52) U.S. Cl.
CPC ........... *H01M 4/628* (2013.01); *H01M 4/131* (2013.01); *H01M 4/505* (2013.01);
(Continued)

(58) Field of Classification Search
CPC ...... H01M 4/628; H01M 4/131; H01M 4/505; H01M 10/0431; H01M 50/489;
(Continued)

(56) References Cited

U.S. PATENT DOCUMENTS 5,746,780 A 5/1998 Narukawa et al.
2005/0244716 A1 11/2005 Ogawa et al.
(Continued)

FOREIGN PATENT DOCUMENTS

JP H08-339818 A 12/1996
JP 2001-143703 A 5/2001
(Continued)

OTHER PUBLICATIONS

International Search Report dated Apr. 20, 2021, issued in counterpart International application No. PCT/JP2021/004632, with English translation. (5 pages).
(Continued)

*Primary Examiner* — Matthew T Martin
*Assistant Examiner* — Kevin Song
(74) *Attorney, Agent, or Firm* — WHDA, LLP

(57) ABSTRACT

This non-aqueous electrolyte secondary battery has: an electrode body formed by winding, in a flat shape, a positive electrode and a negative electrode with a separator interposed therebetween; and a non-aqueous electrolyte. The positive electrode has a positive electrode mixture layer containing a positive electrode active material. In the positive electrode mixture layer, 0.10-0.30 mass % of ceramic particles are added, the volume-based median size (D50) of the ceramic particles is 0.5 μm or less, the air permeability of the separator is 165-310 sec/100 ml, and the air permeability of a flat portion of the separator with respect to the air permeability of a curved portion of the separator is 120-140%.

4 Claims, 7 Drawing Sheets

(51) Int. Cl.

| | |
|---|---|
| ***H01M 4/131*** | (2010.01) |
| ***H01M 4/505*** | (2010.01) |
| ***H01M 10/04*** | (2006.01) |
| ***H01M 50/489*** | (2021.01) |

(52) U.S. Cl.
CPC ..... *H01M 10/0431* (2013.01); *H01M 50/489* (2021.01); *H01M 2004/028* (2013.01)

(58) Field of Classification Search
CPC .. H01M 2004/028; H01M 4/13; H01M 4/485; H01M 50/417; H01M 50/434; H01M 2004/021; H01M 10/0525; H01M 50/443; H01M 50/451; H01M 50/46; H01M 50/491; H01M 4/62; H01M 4/525; H01M 10/052; H01M 10/0587; H01M 50/409; Y02E 60/10; Y02P 70/50
See application file for complete search history.

(56) References Cited

U.S. PATENT DOCUMENTS

| | | | | |
|---|---|---|---|---|
| 2006/0222937 | A1* | 10/2006 | Morimoto ........... | H01M 50/528 429/130 |
| 2008/0160415 | A1* | 7/2008 | Wakita .................... | H01M 4/13 429/231.9 |
| 2009/0023073 | A1 | 1/2009 | Okada et al. | |
| 2009/0092900 | A1 | 4/2009 | Obana et al. | |
| 2010/0279173 | A1* | 11/2010 | Hying ................. | H01M 50/434 427/126.3 |
| 2014/0030595 | A1 | 1/2014 | Kishimi et al. | |
| 2018/0006309 | A1* | 1/2018 | Konno .................. | H01M 4/625 |

FOREIGN PATENT DOCUMENTS

| | | | |
|---|---|---|---|
| JP | 2010-140737 | A | 6/2010 |
| JP | 4-712837 | B2 | 6/2011 |
| JP | 2015-53113 | A | 3/2015 |
| JP | 2016-115611 | A | 6/2016 |
| KR | 20150067110 | A | 6/2015 |

OTHER PUBLICATIONS

Written Opinion dated Apr. 20, 2021, issued in counterpart International application No. PCT/JP2021/004632. (3 pages).
Extended (Supplementary) European Search Report dated Dec. 3, 2024, issued in counterpart EP Application No. 21771974.9. (10 pages).
Office Action dated Nov. 30, 2022, issued in counterpart IN Application No. 202247051617, with English translation. (6 pages).

* cited by examiner

SOLID PHASE STATE

LIQUID PHASE STATE

NON-AQUEOUS ELECTROLYTE SECONDARY BATTERY

TECHNICAL FIELD

The present disclosure generally relates to a non-aqueous electrolyte secondary battery.

BACKGROUND ART

Addition of ceramic particles into a positive electrode mixture layer is a known method applied in a non-aqueous electrolyte secondary battery. For example, a non-aqueous electrolyte secondary battery disclosed in Patent Literature 1 exhibits improvement of thermal stability during charging and improvement of cycle characteristics by coating a positive electrode active material with alumina particles.

CITATION LIST

Patent Literature

PATENT LITERATURE 1: Japanese Unexamined Patent Application Publication No. 2001-143703

SUMMARY

In a non-aqueous electrolyte secondary battery, repeating charging and discharging causes expansion and shrinkage of a positive electrode active material derived from insertion and desorption of lithium ions. As a result, adhesion between a positive electrode and a separator is weakened to cause uneven distance between the positive electrode and a negative electrode, leading to decrease in cycle characteristics. As a solution to this problem, a wound electrode assembly which is flatly press-formed is considered to increase the adhesion between the positive electrode and the separator, for example. In this case, however, pores in the separator are collapsed so as to increase an air permeance of the separator, leading to decrease in output characteristics.

An aspect of a non-aqueous electrolyte secondary battery of the present disclosure is a non-aqueous electrolyte secondary battery, comprising: an electrode assembly in which a positive electrode and a negative electrode are flatly wound with a separator interposed therebetween, the positive electrode having a positive electrode mixture layer including a positive electrode active material; and a non-aqueous electrolyte, wherein ceramic particles are added into the positive electrode mixture layer in an amount of 0.10 to 0.30 mass %, the ceramic particles have a median diameter on a volumetric basis (D50) of 0.5 μm or smaller, the separator has an air permeance of 165 to 310 sec/100-ml, and an air permeance of a flat portion of the separator to an air permeance of a curved surface portion of the separator is 120 to 140%.

According to an aspect of the present disclosure, cycle characteristics can be improved and output characteristics can also be improved.

DESCRIPTION OF EMBODIMENTS

Embodiments of the present disclosure will be described below by using the drawings. Shapes, materials, and numbers described hereinafter are examples, and may be appropriately changed depending on a specification of a non-aqueous electrolyte secondary battery. Hereinafter, description will be made with a same reference sign added to equivalent elements in all the drawings.

[Non-Aqueous Electrolyte Secondary Battery]

Figure 1:
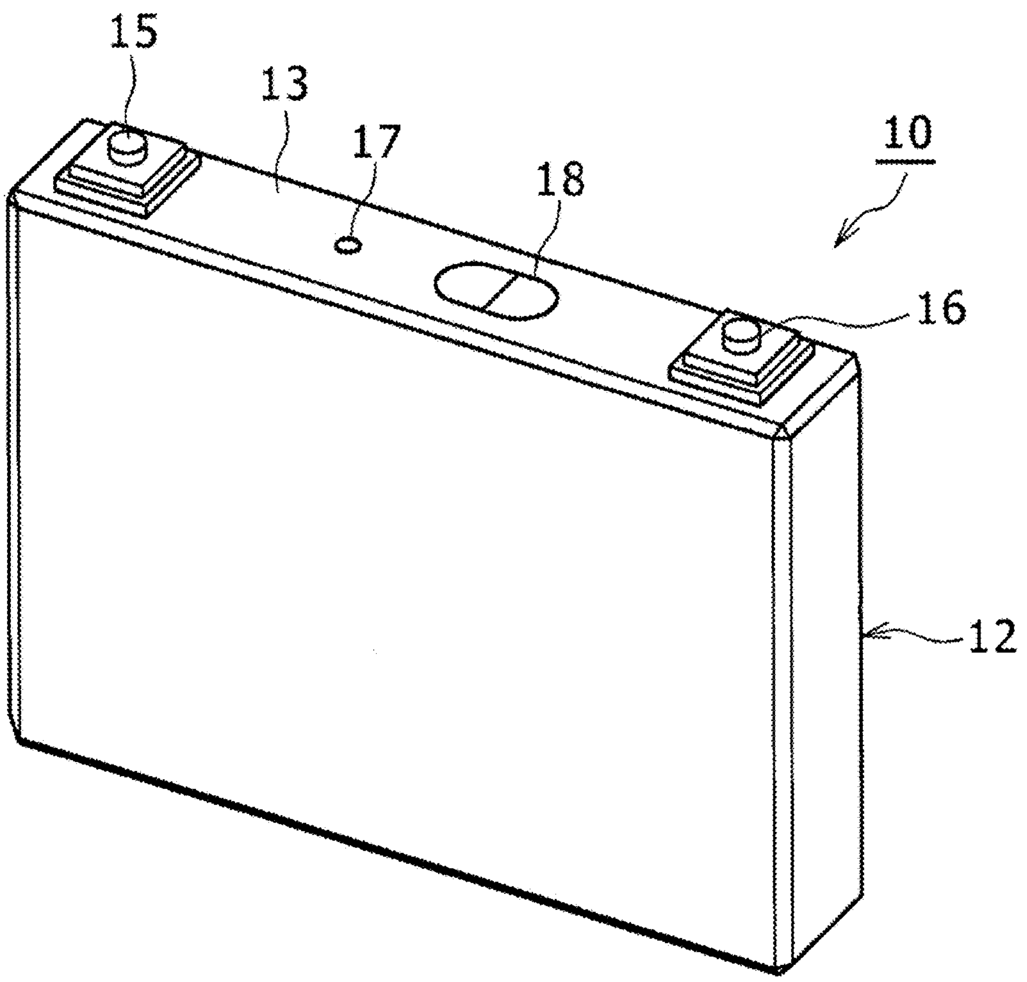
FIG. 1 is a perspective view of a non-aqueous electrolyte secondary battery of an example of an embodiment.

FIG. 1 is a perspective view of a non-aqueous electrolyte secondary battery 10 of an example of the present embodiment. The non-aqueous electrolyte secondary battery 10 has: an electrode assembly 11 in which a positive electrode and a negative electrode are stacking-wound with a separator 40 interposed therebetween to be flatly wound (see FIG. 2); and a non-aqueous electrolyte permeated in the electrode assembly 11. As illustrated in FIG. 1, the non-aqueous electrolyte secondary battery 10 has: a bottomed-cylindrical perpendicular exterior housing can 12 having a rectangular opening on the top side; and a sealing assembly 13 sealing the rectangular opening of the exterior housing can 12.

The exterior housing can 12 is a rectangular can body having the rectangular opening, and used therefor is an integrally formed metal material, such as aluminum and an aluminum alloy, in a predetermined shape. The sealing assembly 13 includes: two external terminals, a positive electrode external terminal 15 and a negative electrode external terminal 16; an injecting port 17 for injecting the non-aqueous electrolyte into the exterior housing can 12; and a gas discharging port 18 for discharging an internal gas outside the non-aqueous electrolyte secondary battery 10 with abnormality in the non-aqueous electrolyte secondary battery 10 due to increase in the internal pressure.

[Electrode Assembly]

Figure 2:
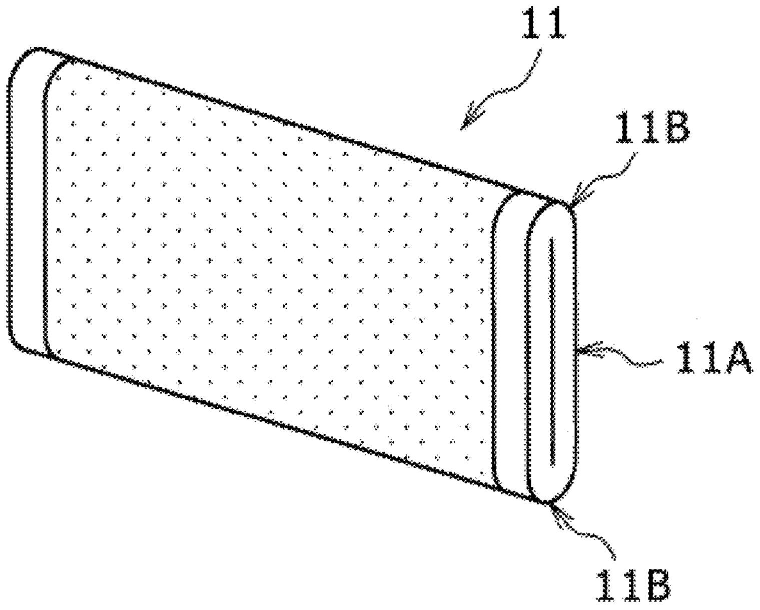
FIG. 2 is a perspective view of an electrode assembly of an example of an embodiment.

FIG. 2 is a perspective view of the electrode assembly 11. As illustrated in FIG. 2, the electrode assembly 11 is an electrode assembly in which the positive electrode and the negative electrode are stacking-wound with the separator 40 interposed therebetween for forming a wound electrode assembly to be flatly formed by applying a pressing pressure in a predetermined direction. The electrode assembly 11 has: a flat portion 11A compression-formed by the pressing pressure; and a curved surface portion 11B which is not compression-formed by the pressing pressure and continuously formed to the flat portion 11A.

[Non-Aqueous Electrolyte]

The non-aqueous electrolyte includes a non-aqueous solvent and an electrolyte salt dissolved in the non-aqueous solvent. The non-aqueous electrolyte may include nitriles. Examples of the nitriles include acetonitrile, propionitrile, butyronitrile, valeronitrile, n-heptanenitrile, succinonitrile, glutaronitrile, adiponitrile, pimelonitrile, 1,2,3-propanetricarbonitrile, and 1,3,5-pentanetricarbonitrile.

[Non-Aqueous Solvent]

Examples of the non-aqueous solvent may include cyclic carbonates, chain carbonates, and carboxylate esters. Specific examples thereof include: cyclic carbonates such as ethylene carbonate (EC), propylene carbonate (PC), butylene carbonate, and vinylene carbonate; chain carbonates such as dimethyl carbonate (DMC), ethyl methyl carbonate (EMC), diethyl carbonate (DEC), methyl propyl carbonate, ethyl propyl carbonate, and methyl isopropyl carbonate; chain carboxylate esters such as methyl propionate (MP), ethyl propionate, methyl acetate, ethyl acetate, and propyl acetate; and cyclic carboxylate esters such as γ-butyrolactone (GBL) and γ-valerolactone (GVL).

The non-aqueous solvent may include ethers. Examples of the ethers include: cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and a crown ether; and chain ethers such as diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl.

The non-aqueous solvent may include a halogen-substituted solvent. Examples of the halogen-substituted solvent include fluorinated cyclic carbonate esters such as 4-fluoroethylene carbonate (FEC), fluorinated chain carbonate esters, and fluorinated chain carboxylate esters such as methyl 3,3,3-trifluoropropionate (FMP).

[Electrolyte Salt]

The electrolyte salt is preferably a lithium salt. As the lithium salt, lithium salts commonly used as a supporting salt in conventional non-aqueous electrolyte secondary batteries may be used. Examples of the lithium salt include $LiBF_4$, $LiClO_4$, $LiPF_6$, $LiAsF_6$, $LiSbF_6$, $LiAlCl_4$, LiSCN, $LiCF_3SO_3$, $LiC(C_2F_5SO_2)_3$, $LiCF_3CO_2$, $Li(P(C_2O_4)F_4)$, $Li(P(C_2O_4)_2F_2)$, $LiPF_{6-x}(C_nF_{2n+1})_x$ (where 1<x<6 and n represents 1 or 2), $LiB_{10}Cl_{10}$, LiCl, LiBr, LiI, lithium chloroborane, a lithium lower aliphatic carboxylate, borate salts such as $Li_2B_4O_7$, $Li(B(C_2O_4)_2)$ [lithium-bisoxalate borate (LiBOB)] and $Li(B(C_2O_4)F_2)$, imide salts such as $LiN(FSO_2)_2$ and $LiN(C_lF_{2l+1}SO_2)(C_mF_{2m+1}SO_2)$ {where l and m represent integers of 1 or more}, and $Li_xP_yO_zF_\alpha$ (where x represents an integer of 1 to 4, y represents 1 or 2, z represents an integer of 1 to 8, and α represents an integer of 1 to 4). Among them, $LiPF_6$, $Li_xP_yO_zF_\alpha$ (where x represents an integer of 1 to 4, y represents 1 or 2, z represents an integer of 1 to 8, and α represents an integer of 1 to 4), and the like are preferred. Examples of $Li_xP_yO_zF_\alpha$ include lithium monofluorophosphate and lithium difluorophosphate. As the lithium salt, one of them may be used singly, and types of the salts may be mixed to be used.

[Positive Electrode]

The positive electrode has a positive electrode core and a positive electrode mixture layer provided on the positive electrode core. For the positive electrode core, a foil of a metal stable within a potential range of the positive electrode, such as aluminum, a film in which such a metal is disposed on a surface layer thereof, and the like may be used. The positive electrode mixture layer includes a positive electrode active material 21, a conductive agent, and a binder 23, and preferably provided on both surfaces of the positive electrode core. Into the positive electrode active material 21, ceramic particles 22, described later in detail, are added.

[Active Material]

The positive electrode active material 21 is a metal oxide including at least lithium and a transition metal element, and for example, may be represented by a general formula $Li_xMe_yO_2$. In the general formula, Me represents a transition metal element such as nickel, cobalt, and manganese. The numeral x represents 0.8 or more and 1.2 or less, for example. The numeral y, which varies depending on a type and oxidation number of Me, represents 0.7 or more and 1.3 or less, for example. The lithium-containing transition metal oxide is particularly preferably lithium nickel-cobalt-manganate containing Ni, Co, and Mn. The positive electrode active material 21 preferably contains 10 to 40 mol % of manganese based on a total amount of the transition metal.

The additional element in the lithium-containing transition metal oxide is not limited to nickel, cobalt, and manganese, and the other additional element may be included. Examples of the other additional element include alkali metal elements other than lithium, transition metal elements other than Mn, Ni, and Co, alkali-earth metal elements, Group 12 elements, Group 13 elements, and Group 14 elements. Specific examples of the other additional element include zirconium (Zr), boron (B), magnesium (Mg), aluminum (Al), titanium (Ti), iron (Fe), copper (Cu), zinc (Zn), tin (Sn), sodium (Na), potassium (K), barium (Ba), strontium (Sr), and calcium (Ca). Among them, Zr is preferred. Containing Zr is considered to stabilize a crystalline structure of the lithium-containing transition metal oxide to improve durability at high temperature and cycle characteristics of the positive electrode mixture layer. A content of Zr in the lithium-containing transition metal oxide is preferably 0.05 mol % or more and 10 mol % or less, more preferably 0.1 mol % or more and 5 mol % or less, and particularly preferably 0.2 mol % or more and 3 mol % or less, based on a total amount of metals excluding Li.

[Ceramic Particles]

Figure 3:
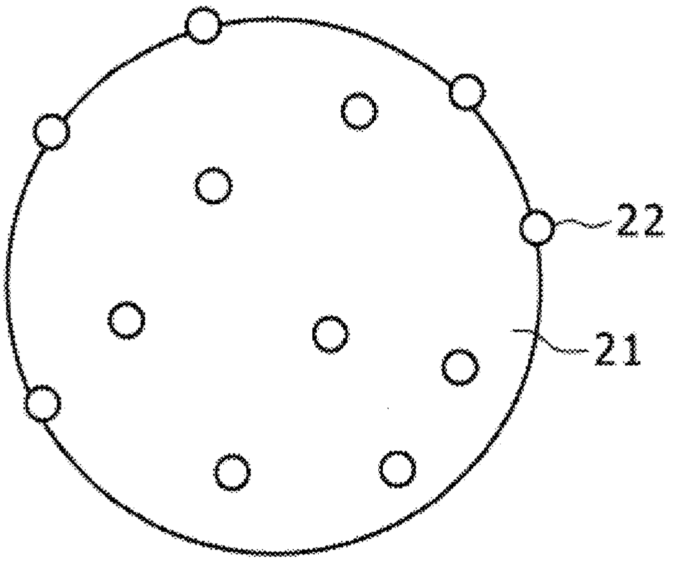
FIG. 3 is a schematic view of a state of ceramic particles added into a positive electrode active material.

FIG. 3 is a schematic view of a state of ceramic particles 22 added into the positive electrode active material 21. As illustrated in FIG. 3, the ceramic particles 22 are added into the positive electrode active material 21 to adheres to a surface of the positive electrode active material 21. The ceramic particles 22 are preferably scattered on the surface of the positive electrode active material 21.

The ceramic particles 22 are insulative ceramics, and an insulative material having high electric resistance is selected. The ceramic particles 22 may be nitride ceramics or oxide ceramics. The ceramic particles 22 include at least one oxide selected from titanium oxide, aluminum oxide, and zirconium dioxide. An amount of the ceramic particles 22 added is preferably 0.10 to 0.30 wt %, and more preferably 0.20 to 0.30 wt %, based on the positive electrode mixture layer.

A median diameter on a volumetric basis (D50) of the ceramic particles 22 is preferably 0.5 μm or smaller, and more preferably 0.05 μm to 0.1 μm. A ratio of a D50 of the positive electrode active material 21 is preferably 10 to 200, and more preferably 15 to 25, where the D50 of the ceramic particles 22 is 1. An intermediate particle diameter means a median diameter at which a volumetric integrated value becomes 50% in a particle size distribution measured with a laser diffraction and scattering-type particle diameter distribution measuring device (for example, LA-750, manufactured by HORIBA, Ltd.).

Figure 4:
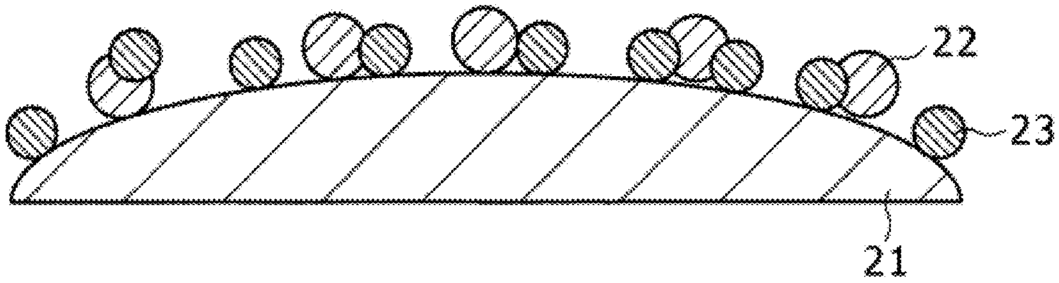
FIG. 4 is a schematic view of a state of a kneaded positive electrode slurry.
Figure 5:
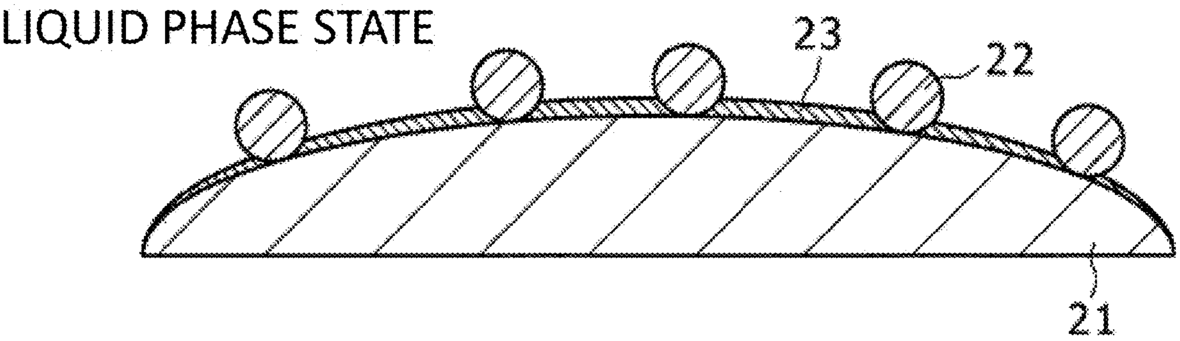
FIG. 5 is a schematic view of another state of a kneaded positive electrode slurry.

FIG. 4 and FIG. 5 are schematic views of states of a kneaded positive electrode slurry. As illustrated in FIG. 4, adding the binder 23 with kneading the positive electrode slurry improves adhesion between the positive electrode active material 21 and the ceramic particles 22. In addition, as illustrated in FIG. 5, the binder 23 is dissolved in a solvent for changing its phase from a solid phase into a liquid phase to enter between the positive electrode active material 21 and the ceramic particles 22, resulting in further improvement in the adhesion between the positive electrode active material 21 and the ceramic particles 22.

Figure 6:
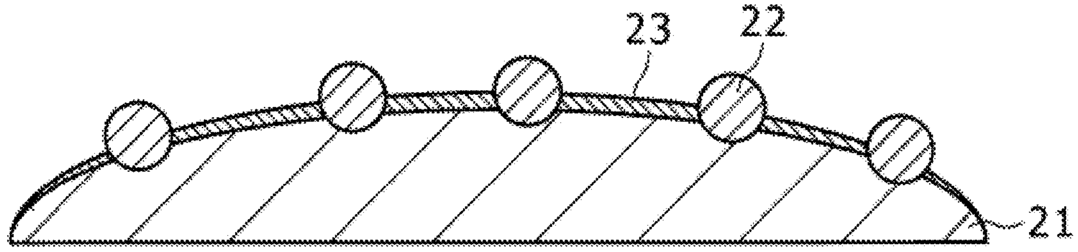
FIG. 6 is a schematic view of a state of a positive electrode active material after compressing a positive electrode mixture layer.

FIG. 6 is a schematic view of a state of the positive electrode active material 21 after compressing the positive electrode mixture layer. As illustrated in FIG. 6, the pressing pressure allows the ceramic particles 22 to enter a surface of the positive electrode active material 21 to further improve the adhesion between the positive electrode active material 21 and the ceramic particles 22. This configuration allows the ceramic particles 22 on the positive electrode active material 21 to enter the separator 40 after press-forming the wound electrode assembly in which the positive electrode and the negative electrode are stacking-wound with the separator 40 interposed therebetween, resulting in improvement in adhesion between the positive electrode and the separator 40. Details will be described later.

[Conductive Agent]

Examples of the conductive agent include carbon materials such as carbon black, acetylene black, Ketjenblack, and graphite. These materials may be used singly, and may be used in combination of two or more thereof.

[Binder]

Examples of the binder 23 include a fluororesin such as polytetrafluoroethylene (PTFE) and polyvinylidene fluoride (PVdF), polyacrylonitrile (PAN), a polyimide resin, an acrylic resin, and a polyolefin resin. With these resins, carboxymethyl cellulose (CMC) or a salt thereof (such as CMC-Na, CMC-K, and CMC-$NH_4$, which may be a partially neutralized salt), polyethylene oxide (PEO), and the like may be used in combination. These materials may be used singly, and may be used in combination of two or more thereof.

[Negative Electrode]

The negative electrode is preferably constituted with a negative electrode current collector made of, for example, a metal foil, and a negative electrode mixture layer formed on one surface or on both surfaces of the current collector. For the negative electrode current collector, a foil of a metal stable within a potential range of the negative electrode, a film in which such a metal is disposed on a surface layer thereof, and the like may be used. The negative electrode mixture layer preferably includes a binder or the like in addition to the negative electrode active material.

[Active Material]

The negative electrode active material is a material that can reversibly occlude and release lithium ions, and examples thereof include: graphite-based carbon materials such as a natural graphite and an artificial graphite; amorphous carbon materials; metals to form an alloy with lithium, such as Si and Sn; alloy materials; or composite metal oxide. These materials may be used singly, and may be used in combination of two or more thereof. In particular, a carbon material including a graphite-based carbon material and an amorphous carbon material adhered to a surface of the graphite-based carbon material is preferably used from the viewpoints of easily forming a low-resistance coating on the negative electrode surface and the like.

The graphite-based carbon material is referred to a carbon material with developed graphite crystalline structure, and examples thereof include a natural graphite and an artificial graphite. These carbon materials may be flake, and may be spheroidized to form a spherical shape. The artificial graphite is produced by heat-treating a raw material such as petroleum, coal pitch, and coke at 2000 to 3000° C. or higher with an Atchison furnace, a graphite heater furnace, or the like. A d(002)-plane spacing with X-ray diffraction is preferably 0.338 nm or smaller, and a crystalline thickness in the c-axial direction (Lc(002)) is preferably 30 to 1000 nm.

The amorphous carbon material is referred to a carbon material with undeveloped graphite crystalline structure, and a carbon with a state of amorphous or turbostratic structure of fine crystals. The amorphous carbon material more specifically means having the d(002)-plane spacing with X-ray diffraction of 0.342 nm or larger. Examples of the amorphous carbon material include hard carbon (hardly graphitizable carbon), soft carbon (easily graphitizable carbon), carbon black, carbon fiber, and active carbon. A manufacturing method of these materials is not particularly limited. For example, these materials are obtained by carbonizing a resin or a resin composition. Phenolic thermosetting resins, thermoplastic resins such as polyacrylonitrile, petroleum-based or coal-based tar, pitch, or the like may be used therefor. Carbon black is obtained by, for example, pyrolysis of hydrocarbon as a raw material, and examples of the pyrolysis method include a thermal method, an acetylene decomposition method, and the like. Examples of incomplete combustion methods include a contact method, a lump-soot method, a gas-furnace method, and an oil-furnace method. Specific examples of carbon black generated by these manufacturing methods include acetylene black, Ketjenblack, thermal black, and furnace black. A surface of these amorphous carbon materials may be coated with another amorphous or unshaped carbon.

The amorphous carbon material is preferably present with adhering to a surface of the graphite-based carbon material. Here, the adhering means a state of chemically or physically bonding, and means that the negative electrode active material of the present disclosure does not release the graphite-based carbon material and the amorphous carbon material even with stirred in water or an organic solvent.

Adhering the amorphous carbon material, which has a larger reaction area and more orientation constructing structure than the graphite-based carbon, to the surface of the graphite-based carbon material is considered to form a coating having a low reaction overvoltage on the surface of the amorphous carbon material, resulting in reduced reaction overvoltage to insertion and desorption reactions of Li in an entire graphite-based carbon material. In addition, since having a higher reaction potential than the graphite-based carbon material, the amorphous carbon material preferentially reacts with Group 5 or Group 6 element eluted from the positive electrode to form a good coating having more excellent lithium-ion permeability on the surface of the amorphous carbon material; thus, the reaction resistance to the insertion and desorption reactions of Li in an entire graphite-based carbon material is considered to be further reduced.

A ratio between the graphite-based carbon material and the amorphous carbon material is not particularly limited, but a higher ratio of the amorphous carbon material, which has excellent Li-occluding ability, is preferred. A ratio of the amorphous carbon material is preferably 0.5 wt % or more, and more preferably 2 wt % or more, in the active material. It is to be noted that the upper limit is preferably set with considering that an excess amount of the amorphous carbon material fails to uniformly adhere to the graphite surface.

Examples of a method of adhering the amorphous carbon to the graphite-based carbon material include: solid phase methods for coating such as a method of adding petroleum-based or coal-based tar, pitch, or the like into the amorphous carbon material for mixing with the graphite-based carbon material followed by heat treatment, a mechano-fusion method in which a compressive shear stress is applied between the graphite particles and the solid amorphous carbon for coating, and a spattering method; and a liquid phase method in which the amorphous carbon is dissolved in a solvent such as toluene and the graphite particles is immersed therein, and then subjected to heat treatment.

A primary-particle diameter of the amorphous carbon is preferably smaller from the viewpoint of a distance of a diffusion of Li. A specific surface area is preferably larger because such a larger specific surface area enlarges a reaction surface area for the Li occlusion reaction. However, a too large specific surface area causes an excessive reaction on the surface to increase the resistance. Thus, the specific surface area of the amorphous carbon is preferably 5 $m^2/g$ or more and 200 $m^2/g$ or less. From the viewpoint of reducing the excessive specific surface area, the primary particle diameter is preferably 20 nm or larger and 1000 nm or smaller, more preferably 40 nm or larger and 100 nm or smaller, and is preferably not a hollow structure having hollows inside the particles.

[Binder]

As the binder, a fluororesin, PAN, a polyimide resin, an acrylic resin, a polyolefin resin, and the like may be used similarly to a case of the positive electrode. When a negative electrode mixture slurry is prepared by using an aqueous solvent, preferably used are styrene-butadiene rubber (SBR), CMC or a salt thereof, polyacrylic acid (PAA) or a salt thereof (such as PAA-Na and PAA-K, which may be a partially neutralized salt), polyvinyl alcohol (PVA), and the like.

[Separator]

For the separator 40, a porous sheet having an ion permeability and an insulation property is used, for example. Specific examples of the porous sheet include a fine porous thin film, a woven fabric, and a nonwoven fabric. As a material for the separator 40, an olefin resin such as polyethylene and polypropylene, cellulose, and the like are preferred. The separator 40 may be a stacked body having a cellulose fiber layer and a thermoplastic resin fiber layer such as an olefin resin. The separator 40 may also be a multilayer separator including a polyethylene layer and a polypropylene layer. A separator in which a resin such as aramid resin is applied on the surface of the separator 40 may be also used. Among these materials, a polyolefin resin is preferably used.

In the separator 40 using polyolefin resin, pores are formed by, for example, a known method such as a dry method and a wet method. Regulating a size and number of the pores may regulate an air permeability (air permeance) of the separator 40. The air permeance may be measured by a Gurley tester method (in accordance with JIS P8117).

Thereafter, when the separator, the positive electrode, the separator, and the negative electrode are stacked in this order and wound for flatly press-forming to produce the electrode assembly 11, the pores in the separator 40 are collapsed by the press-forming to change the air permeance of the separator 40 constituted as the electrode assembly 11.

The air permeance of the separator 40 is preferably 165 to 310 sec/100-ml, and more preferably 180 to 310 sec/100-ml. The air permeance of the separator 40 is regulated so that the D50 of the ceramic particles 22 is sufficiently larger than a diameter of a pore 40A of the separator 40.

A rate of an air permeance of a flat portion of the separator 40 (a part opposite to the flat portion 11A of the electrode assembly 11) to an air permeance of a curved surface portion of the separator 40 (a part opposite to the curved surface portion 11B of the electrode assembly 11) is preferably 120 to 140%, and more preferably 130 to 140%. Since the curved surface portion of the separator 40 is not compressed by the pressing pressure, the curved surface portion of the separator 40 has the same air permeance as that of the separator 40 before the press-forming. The flat portion of the separator 40 has the same air permeance as that of the separator 40 after the press-forming. In other words, the air permeance of the separator 40 after the press-forming relative to the air permeance of the separator 40 before the press-forming is preferably 120 to 140%, and more preferably 130 to 140%.

Figure 7:
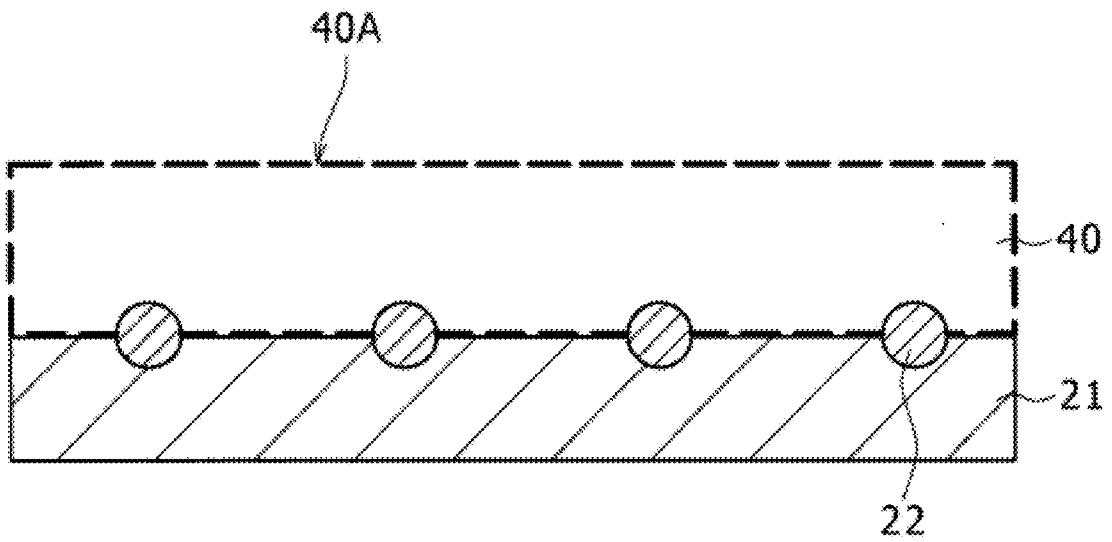
FIG. 7 is a schematic view of a state of a positive electrode active material and a separator after press-forming an electrode assembly.

FIG. 7 is a schematic view of a state of the positive electrode active material 21 and separator 40 after press-forming an electrode assembly 11. As illustrated in FIG. 7, the ceramic particles 22 adhered to the positive electrode active material 21 enter the separator 40 to exhibit an anchor effect, resulting in enhancement of adhesion between the positive electrode active material 21 and the separator 40. This configuration inhibits generation of a gap between the separator 40 and the positive electrode due to expansion or shrinkage of the positive electrode active material 21 during a cycle, and cycle characteristics of the non-aqueous electrolyte secondary battery 10 may be improved.

In the present embodiment, the ceramic particles 22 have a sufficiently larger D50 than the diameter of a pore 40A of the separator 40. Thus, no ceramic particle 22 permeates the pore 40A of the separator 40.

To improve adhesive strength between the separator 40 and the positive electrode active material 21 without adding the ceramic particles 22, it is considered to increase the pressing pressure, for example. Such an increase in the pressing pressure, however, increases the air permeance of the separator 40 to decrease output characteristics of the non-aqueous electrolyte secondary battery 10. When an excess amount of the ceramic particles 22 are added, the lithium-ion diffusion reaction is inhibited to decrease output characteristics of the non-aqueous electrolyte secondary battery 10. In the present embodiment, adding an appropriate amount of the ceramic particles 22 may improve the cycle characteristics without decreasing in the output characteristics of the non-aqueous electrolyte secondary battery 10.

In addition, the present embodiment forms a narrow gap near a contacting surface between the separator 40 and the ceramic particles 22 to permeate the electrolyte liquid in the gap and to hold the permeated electrolyte liquid. This configuration may avoid deterioration of the cycle characteristics due to liquid shortage during a cycle of the non-aqueous electrolyte secondary battery 10.

The present invention is not limited to the above embodiments and modified examples thereof, and various changes and modifications may be deservedly made within the scope of the claimed subject matter of the present application.

EXAMPLES

The present disclosure will be further described below, but the present disclosure is not limited to these Examples.

Example 1

[Production of Positive Electrode]

A lithium-nickel-cobalt-manganese composite oxide ($LiNi_{0.35}Co_{0.35}Mn_{0.30}O_2$) into which 0.20 wt % of ceramic particles having a D50 of 0.5 μm or smaller were added, as the positive electrode active material, polyvinylidene fluoride as the binder, carbon black as the conductive agent, and N-methyl-2-pyrrolidone as a dispersant were kneaded to produce a positive electrode active material mixture slurry. This positive electrode active material mixture slurry was produced so that a mass ratio of the lithium-nickel-cobalt-manganese composite oxide:polyvinylidene fluoride:carbon black was 90:3:7. Subsequently, this positive electrode active material mixture slurry was applied to both surfaces of an aluminum foil having a thickness of 15 μm as the positive electrode core with a die coater, and then the positive electrode active material mixture slurry was dried for removing N-methyl-2-pyrrolidone as the dispersant to form a positive electrode active material mixture layer on the positive electrode core. Thereafter, the positive electrode active material mixture layer was compressed by using a compression roller until the filling density became a predetermined value (2.5 g/cm$^3$), and cut in a predetermined size so that a positive electrode core exposed part was formed on one side in the longitudinal direction of a positive electrode plate to obtain the positive electrode plate.

[Production of Negative Electrode]

Graphite as the negative electrode active material, styrene-butadiene rubber (SBR) as the binder, carboxymethyl cellulose (CMC) as a thickener, and water as a dispersant were kneaded so that a mass ratio of the graphite:SBR:CMC was 99.2:0.6:0.2 to produce a negative electrode active material mixture slurry. The negative electrode active material mixture slurry was applied on both surfaces of a copper foil having a thickness of 8 μm as the negative electrode core with a die coater, and then the negative electrode active material mixture slurry was dried for removing water in the negative electrode active material mixture slurry to form a negative electrode active material mixture layer on the core. Thereafter, the negative electrode active material mixture layer was compressed by using a compression roller until the filling density became a predetermined value (1.2 g/cm$^3$), and cut in a predetermined size so that a negative electrode core exposed part was formed on one side in the longitudinal direction of a negative electrode plate to obtain the positive electrode plate.

[Production of Electrode Assembly]

The positive electrode plate produced in the above method and the negative electrode plate produced in the above method were wound with a separator interposed therebetween which is made of polypropylene having a thickness of 18 μm and an air permeance of 140 sec/100-ml, and then the wound product was flatly press-formed to produce a flat wound electrode assembly. The wound product was formed by stacking the separator, the positive electrode, the separator, and the negative electrode in this order to be wound with a cylindrical winding core. The positive electrode and the negative electrode were wound so that each of the core exposed parts was mutually positioned at the opposite side against the axial direction of the wound product. At this time, an air permeance of the original separator before the press-forming was measured in advance. The press-formed flat wound electrode assembly was disassembled to measure an air permeance of a press-formed portion in the flat portion of the separator, and the air permeances of the separator before and after the press-forming were compared. The air permeance of the separator after the press-forming was 168 sec/100-ml, and the increasing rate of the air permeance after the press-forming was 120%. The air permeance was measured as the Gurley air permeance (in accordance with JIS P8117).

[Preparation of Non-Aqueous Electrolyte Liquid]

Ethylene carbonate (EC), ethyl methyl carbonate (EMC), and dimethyl carbonate (DMC) were mixed at a volume ratio (25° C., 1 atm) of 3:3:4 to produce a mixed solvent. Into this mixed solvent, $LiPF_6$ as a solute was added at a concentration of 1.15 mol/L, and lithium fluorosulfonate was further added in an amount of 1 mass % to prepare a non-aqueous electrolyte liquid.

[Production of Non-Aqueous Electrolyte Secondary Battery]

A positive electrode current collector plate was welded to the positive electrode core exposed part, and a negative electrode current collector plate was welded to the negative electrode core exposed part. Then, the electrode assembly was housed in a rectangular exterior housing can, and each current collector plate was connected to the corresponding terminal. A sealing plate was attached to an opening of the exterior housing can, the above non-aqueous electrolyte liquid was injected through an electrolyte liquid injecting port on the sealing plate, and then the injecting port was sealed with a sealing plug to obtain a non-aqueous electrolyte secondary battery having a rating capacity of 4.1 Ah.

Example 2

A battery was produced in the same manner as in Example 1 except that: the air permeance of the separator after the press-forming was 182 sec/100-ml; and the increasing rate of the air permeance of the separator after the press-forming was 130%, in the production of the electrode assembly.

Example 3

A battery was produced in the same manner as in Example 1 except that: the air permeance of the separator after the press-forming was 196 sec/100-ml; and the increasing rate of the air permeance of the separator after the press-forming was 140%, in the production of the electrode assembly.

Example 4

A battery was produced in the same manner as in Example 2 except that the ceramic particles having a D50 of 0.5 μm or smaller was added in amount of 0.10 wt % in the production of the positive electrode.

Example 5

A battery was produced in the same manner as in Example 2 except that the ceramic particles having a D50 of 0.5 μm or smaller was added in amount of 0.30 wt % in the production of the positive electrode.

Example 6

A separator having a Gurley air permeance of 220 sec/100-ml was prepared. A battery was produced in the same manner as in Example 1 except that: the air permeance of the separator after the press-forming was 264 sec/100-ml; and the increasing rate of the air permeance of the separator after the press-forming was 120%, in the production of the electrode assembly.

Example 7

A battery was produced in the same manner as in Example 6 except that: the air permeance of the separator after the press-forming was 286 sec/100-ml; and the increasing rate of the air permeance of the separator after the press-forming was 130%, in the production of the electrode assembly.

Example 8

A battery was produced in the same manner as in Example 6 except that: the air permeance of the separator after the press-forming was 308 sec/100-ml; and the increasing rate of the air permeance of the separator after the press-forming was 140%, in the production of the electrode assembly.

Comparative Example 1

A battery was produced in the same manner as in Example 1 except that: no ceramic particle was added in the production of the positive electrode; the air permeance of the separator after the press-forming was 154 sec/100-ml; and the increasing rate of the air permeance of the separator after the press-forming was 110%, in the production of the electrode assembly.

Comparative Example 2

A battery was produced in the same manner as in Comparative Example 1 except that: the air permeance of the separator after the press-forming was 168 sec/100-ml; and the increasing rate of the air permeance of the separator after the press-forming was 120%, in the production of the electrode assembly.

Comparative Example 3

A battery was produced in the same manner as in Comparative Example 1 except that: the air permeance of the separator after the press-forming was 182 sec/100-ml; and the increasing rate of the air permeance of the separator after the press-forming was 130%, in the production of the electrode assembly.

Comparative Example 4

A battery was produced in the same manner as in Comparative Example 1 except that: the air permeance of the separator after the press-forming was 196 sec/100-ml; and the increasing rate of the air permeance of the separator after the press-forming was 140%, in the production of the electrode assembly.

Comparative Example 5

A battery was produced in the same manner as in Comparative Example 1 except that: the air permeance of the separator after the press-forming was 210 sec/100-ml; and the increasing rate of the air permeance of the separator after the press-forming was 150%, in the production of the electrode assembly.

Comparative Example 6

A battery was produced in the same manner as in Comparative Example 1 except that the ceramic particles having a D50 of 0.5 μm or smaller was added in amount of 0.20 wt % in the production of the positive electrode.

Comparative Example 7

A battery was produced in the same manner as in Comparative Example 5 except that the ceramic particles having a D50 of 0.5 μm or smaller was added in amount of 0.20 wt % in the production of the positive electrode.

Comparative Example 8

A battery was produced in the same manner as in Comparative Example 3 except that the ceramic particles having a D50 of 0.5 μm or smaller was added in amount of 0.05 wt % in the production of the positive electrode.

Comparative Example 9

A battery was produced in the same manner as in Comparative Example 3 except that the ceramic particles having a D50 of 0.5 μm or smaller was added in amount of 0.4 wt % in the production of the positive electrode.

Comparative Example 10

A separator having a Gurley air permeance of 220 sec/100-ml was prepared. A battery was produced in the same manner as in Comparative Example 6 except that: the air permeance of the separator after the press-forming was 242 sec/100-ml; and the increasing rate of the air permeance of the separator after the press-forming was 110%, in the production of the electrode assembly.

Comparative Example 11

A battery was produced in the same manner as in Comparative Example 10 except that: the air permeance of the separator after the press-forming was 330 sec/100-ml; and the increasing rate of the air permeance of the separator after the press-forming was 150%, in the production of the electrode assembly.

[Formability]

Confirmed was whether the electrode assembly was formed in a predetermined height and in a predetermined thickness.

[Output Characteristic]

The non-aqueous electrolyte secondary battery was CCCV-charged under an environment at 25° C. at a charging current of 1/10 It until a depth of charge (SOC) reached 50%. Then, the non-aqueous electrolyte secondary battery was left to stand under an environment at 25° C. for 2 hours. Thereafter, the battery was discharged under an environment at 25° C. at a current of 1 It, 2 It, 4 It, 8 It, 10 It, 12 It, and 16 It, for 10 seconds to measure each battery voltage. Each of the current values and each of the battery voltages were plotted to calculate an output (W) based on the I-V characteristics during discharging, and the output was specified as an output characteristic at ambient temperature. The shifted depth of charge due to the discharge was recovered to the original depth of charge by charging at a constant current of 1 It. Table 1 shows the output characteristics as relative values based on 100 of the output characteristic of the battery of Comparative Example 1.

[Cycle Characteristic]

The battery was charged under a condition at 25° C. at a constant current of 1 It until a battery voltage reached 4.10

V. Then, the battery was charged at a constant voltage of 4.10 V for 1.5 hours. After an intermission of 10 seconds, the battery was discharged at a constant current of 1 It until a battery voltage reached 2.5 V. A discharge capacity at this time was specified as a battery capacity before cycle. Next, the battery was subjected to the following charge-discharge cycle 400 times under a condition at 25° C. The battery was charged at a constant current of 2 It until a battery voltage reached 4.10 V. After an intermission of 10 seconds, the battery was discharged at a constant current of 2 It until a battery voltage reached 3.0 V. This charging and discharging were taken as 1 cycle. After 400 cycles, the battery was charged under a condition at 25° C. at a constant current of 1 It until a battery voltage reached 4.1 V. Then, the battery was charged at a constant voltage of 4.1 V for 1.5 hours. After an intermission of 10 seconds, the battery was discharged at a constant current of 1 It until a battery voltage reached 2.5 V. A discharge capacity at this time was specified as a battery capacity after cycle at high temperature. A capacity maintenance rate after cycle at high temperature was calculated by the following formula. Table 1 shows the cycle characteristics as relative values based on 100 of the cycle characteristic of the battery of Comparative Example 1.

Capacity Maintenance Rate=(Battery Capacity after Cycle (*Ah*)/Battery Capacity before Cycle (*Ah*))

was remarkably improved. This was presumably because adding the ceramic particles enhanced the adhesion between the positive electrode mixture layer and the separator during the press-forming and inhibited capacity deterioration during the charge-discharge cycle.

In Examples 4 to 5, it was confirmed that the formability, the output characteristic, and the cycle characteristic were improved comparing to Comparative Example 3 by adding the ceramic particles.

In Examples 6 to 8, the formability after the press-forming, the output characteristic, and the cycle characteristic exhibited the same tendency to Examples 1 to 3, and it was confirmed that the increasing rate of the air permeance of the separator after the press-forming was preferably within a range of 120 to 140% even with using separators having different air permeances.

In Comparative Examples 1 to 5, it was confirmed that increase in the pressing pressure causes collapse of the separator pores and increase in the air permeance of the separator, leading to deterioration. The formability was insufficient even in Comparative Example 5, where the pressing pressure was the largest.

In Comparative Example 6, the formability was insufficient due to the insufficient pressing pressure. Even adding the ceramic particles, an increasing rate of the air permeance of the separator was 110% and the cycle characteristics were not improved.

TABLE 1

| | Amount of added ceramic particles (wt %) | Air permeance of separator after press-forming (sec/100 ml) | Increasing rate of air permeance of separator after press-forming (%) | Formability | Output characteristic (%) | Cycle characteristic (%) |
|---|---|---|---|---|---|---|
| Example 1 | 0.20 | 168 | 120 | ○ | 104 | 112 |
| Example 2 | 0.20 | 182 | 130 | ○ | 105 | 116 |
| Example 3 | 0.20 | 196 | 140 | ○ | 105 | 118 |
| Example 4 | 0.10 | 182 | 130 | ○ | 106 | 110 |
| Example 5 | 0.30 | 182 | 130 | ○ | 104 | 117 |
| Example 6 | 0.20 | 264 | 120 | ○ | 103 | 109 |
| Example 7 | 0.20 | 286 | 130 | ○ | 102 | 114 |
| Example 8 | 0.20 | 308 | 140 | ○ | 102 | 117 |
| Comparative Example 1 | 0 | 154 | 110 | X | 100 | 100 |
| Comparative Example 2 | 0 | 168 | 120 | X | 99 | 101 |
| Comparative Example 3 | 0 | 182 | 130 | X | 97 | 102 |
| Comparative Example 4 | 0 | 196 | 140 | X | 95 | 103 |
| Comparative Example 5 | 0 | 210 | 150 | X | 93 | 101 |
| Comparative Example 6 | 0.20 | 154 | 110 | X | 101 | 102 |
| Comparative Example 7 | 0.20 | 210 | 150 | ○ | 98 | 103 |
| Comparative Example 8 | 0.05 | 182 | 130 | X | 98 | 102 |
| Comparative Example 9 | 0.40 | 182 | 130 | ○ | 98 | 109 |
| Comparative Example 10 | 0.20 | 242 | 110 | X | 97 | 98 |
| Comparative Example 11 | 0.20 | 330 | 150 | ○ | 97 | 102 |

As shown in Table 1, any of the batteries of Examples 1 to 8 has excellent output characteristic and cycle characteristic.

In Examples 1 to 3, it was confirmed that the air permeance and increasing rate of the separator after the press-forming were same as in Comparative Examples 2 to 4, but the formability was improved and the cycle characteristic In Comparative Example 7, the pressing pressure was the largest and the formability was sufficient, but output characteristic and cycle characteristic were lowered compared to Examples 1 to 3. This was presumably because the adhesion between the positive electrode mixture layer and the separator was too strong due to the large pressing pressure so that the electrolyte liquid hardly permeated thereinto, leading to failure of an effect of improvement in the output characteristic and the cycle characteristic.

In Comparative Example 8, ceramic particles were added into the positive electrode active material at 0.05 wt % but exhibited almost same output characteristic and cycle characteristic comparing to Comparative Example 3, and adding the inorganic particles did not improve output characteristics and cycle characteristics. This was presumably because the added amount of inorganic particles was insufficient.

In Comparative Example 9, the added amount of ceramic particles was excessive (added amount: 0.40 wt %), the output characteristic was lowered presumably because ceramic particles became a resistive component in the positive electrode mixture layer.

In Comparative Examples 10 to 11, the formability after the press-forming, the output characteristic, and the cycle characteristic exhibited the same tendency to Comparative Examples 6 and 7 and Examples 1 to 3, and it was confirmed that the increasing rate of the air permeance of the separator after the press-forming was preferably within a range of 120 to 140% even with using separators having different air permeances.

REFERENCE SINGS LIST

10 Non-aqueous electrolyte secondary battery
11 Electrode assembly
11A Flat portion
11B Curved surface portion
12 Exterior housing can
13 Sealing assembly
15 Positive electrode external terminal
16 Negative electrode external terminal
18 Gas discharging port
20 Positive electrode
21 Positive electrode active material
21 Positive electrode core
22 Ceramic particle
23 Binder
40 Separator
40A Pore

The invention claimed is:

1. A non-aqueous electrolyte secondary battery, comprising:

an electrode assembly in which a positive electrode and a negative electrode are flatly wound with a separator interposed therebetween, the positive electrode having a positive electrode mixture layer including a positive electrode active material; and a non-aqueous electrolyte, wherein ceramic particles are added into the positive electrode mixture layer in an amount of 0.10 to 0.30 mass %, the ceramic particles have a median diameter on a volumetric basis (D50) of 0.05 μm to 0.5 μm, the separator has an air permeance of 165 to 310 sec/100-ml, an air permeance of a flat portion of the separator to an air permeance of a curved surface portion of the separator is 120 to 140%, the ceramic particles are insulative and are present on a surface of the positive electrode active material, and the ceramic particles are physically embedded in both surfaces of the positive electrode active material and the separator by press-forming the flatly wound electrode assembly.

2. The non-aqueous electrolyte secondary battery according to claim 1, wherein a ratio of a D50 of the positive electrode active material to a D50 of a ceramic particle is 10 to 200, where the D50 of the ceramic particles is 1.

3. The non-aqueous electrolyte secondary battery according to claim 1, wherein the positive electrode active material contains 10 to 40 mol % of manganese based on a total amount of transition metal elements.

4. The non-aqueous electrolyte secondary battery according to claim 1, wherein the ceramic particles include at least one oxide selected from titanium oxide, aluminum oxide, and zirconium dioxide.

* * * * *